(12) United States Patent
Bock et al.

(10) Patent No.: US 7,630,011 B1
(45) Date of Patent: Dec. 8, 2009

(54) HIGH-SPEED SAMPLING OF SIGNALS IN ACTIVE PIXEL SENSORS

(75) Inventors: Nikolai E. Bock, Pasadena, CA (US); Alexander I. Krymski, Montrose, CA (US); Barmak Mansoorian, San Diego, CA (US)

(73) Assignee: Aptina Imaging Corporation (KY)

( * ) Notice: Subject to any disclaimer, the term of this patent is extended or adjusted under 35 U.S.C. 154(b) by 0 days.

(21) Appl. No.: 09/527,422

(22) Filed: Mar. 17, 2000

Related U.S. Application Data

(60) Provisional application No. 60/125,255, filed on Mar. 19, 1999.

(51) Int. Cl.
H04N 3/14 (2006.01)

(52) U.S. Cl. ..................................................... 348/308

(58) Field of Classification Search .................. 348/294, 348/297, 308, 302, 311, 313; 250/208.1; 257/291, 292
See application file for complete search history.

(56) References Cited

U.S. PATENT DOCUMENTS

| | | | | |
|---|---|---|---|---|
| 5,898,168 A * | 4/1999 | Gowda et al. | ............ | 250/208.1 |
| 5,965,871 A * | 10/1999 | Zhou et al. | ............... | 250/208.1 |
| 6,130,423 A * | 10/2000 | Brehmer et al. | .......... | 250/208.1 |
| 6,222,175 B1 * | 4/2001 | Krymski | ................. | 250/208.1 |
| 6,320,616 B1 * | 11/2001 | Sauer | .......................... | 348/241 |
| 6,320,617 B1 * | 11/2001 | Gee et al. | .................... | 348/302 |
| 6,421,085 B1 * | 7/2002 | Xu | .............................. | 348/308 |
| 6,441,357 B2 * | 8/2002 | Ang et al. | ................ | 250/208.1 |
| 6,498,332 B2 * | 12/2002 | Funakoshi | ............... | 250/208.1 |
| 6,498,347 B2 * | 12/2002 | Sauer et al. | .............. | 250/338.1 |
| 6,512,544 B1 * | 1/2003 | Merrill et al. | ............... | 348/302 |
| 6,606,122 B1 * | 8/2003 | Shaw et al. | ................. | 348/302 |
| 6,697,114 B1 * | 2/2004 | Merrill | ....................... | 348/308 |
| 6,704,050 B1 * | 3/2004 | Washkurak et al. | ......... | 348/294 |
| 6,727,946 B1 * | 4/2004 | Zhao et al. | .................. | 348/308 |

* cited by examiner

*Primary Examiner*—Justin P Misleh
(74) *Attorney, Agent, or Firm*—Dickstein Shapiro LLP

(57) ABSTRACT

Techniques are disclosed for enhancing the speed at which pixel levels are read out and sampled for processing. A method of processing pixel levels includes clamping a pixel readout line to a voltage level less than a voltage corresponding to a signal sensed by an n-MOS pixel. Subsequently, the pixel readout line is coupled to an output of an n-MOS source-follower and the pixel signal is read out onto the pixel readout line through the n-MOS source-follower. The pixel signal that was read out is passed through a p-MOS source-follower to a processing circuit. Before passing the pixel signal through the p-MOS source-follower to the processing circuit, a capacitive storage node in the processing circuit is clamped to a voltage greater than a signal at an input to the p-MOS source-follower. Subsequently, an output of the p-MOS source-follower is coupled to the processing circuit, and a signal corresponding to the pixel signal is stored by the processing circuit. Similar techniques are provided for reading out and sampling p-MOS pixels.

22 Claims, 9 Drawing Sheets

HIGH-SPEED SAMPLING OF SIGNALS IN ACTIVE PIXEL SENSORS

CROSS-REFERENCE TO RELATED APPLICATIONS

This application claims the priority of U.S. Provisional Patent Application No. 60/125,255, filed on Mar. 19, 1999.

BACKGROUND

This disclosure relates to high-speed sampling of signals in active pixel sensors (APS).

Image sensors find applications in a wide variety of fields, including machine vision, robotics, guidance and navigation, automotive applications, and consumer products. Active pixel sensors can be made compatible with complementary metal-oxide-semiconductor (CMOS) technologies and have one or more active transistors within the pixel unit cell.

SUMMARY

In general, according to one aspect, a method of processing pixel levels from an n-MOS pixel includes clamping a pixel readout line to a voltage level less than a voltage corresponding to a pixel signal. Subsequently, the pixel readout line is coupled to an output of an n-MOS source-follower and the pixel signal is read out onto the pixel readout line through the n-MOS source-follower. A signal corresponding to the pixel signal that was read out is stored.

In various implementations, one or more of the following features can be present. For example, clamping the pixel readout line can include discharging a capacitance on the pixel readout line. The pixel readout line can be discharged while processing a previously-stored pixel signal. Discharging the pixel readout line can include disabling a pixel selection switch. Alternatively, discharging the pixel readout line can include enabling a switch to couple the pixel readout line to ground.

In some implementations, a capacitive storage node in a pixel signal processing circuit is clamped to a voltage less than a voltage corresponding to the pixel signal appearing on the pixel readout line. The pixel readout line can be subsequently coupled to the storage node in the processing circuit, and a signal corresponding to the pixel signal can be stored on the capacitive storage node.

The pixel then can be reset, and a reset signal can be read out through the n-MOS source-follower. A signal that corresponds to the reset signal can be stored on a second capacitive storage node in the processing circuit.

In other implementations, the pixel signal can be passed from the pixel readout line through a p-MOS source-follower to a pixel signal processing circuit. Before passing the pixel signal through the p-MOS source-follower to the processing circuit, a capacitive storage node in the processing circuit can be clamped to a voltage greater than a signal appearing at an input to the p-MOS source-follower. Subsequently, an output of the p-MOS source-follower can be coupled to the storage node in the processing circuit, and a signal corresponding to the pixel signal can be stored in the processing circuit.

After reading out the pixel signal, the pixel can be reset. Subsequently, a reset signal from the pixel can be read out onto the pixel readout line through the n-MOS source-follower. Prior to passing the reset signal through the p-MOS source-follower to the processing circuit, a second storage node in the processing circuit can be clamped to a voltage level higher than the reset signal appearing at the input to the p-MOS source-follower. After passing the second signal through the p-MOS source-follower to the processing circuit, a signal corresponding to the reset signal can be stored in the processing circuit.

Various techniques can be used to process the pixel signals stored by the processing circuit. In some implementations, the techniques described here can help increase the speed at which pixel signals are sampled.

Similar techniques can be used to sample signals from p-MOS pixels as described in greater detail below.

Circuits for performing the foregoing techniques, as well as imagers that include those circuits, also are described below.

Other features and advantages will be readily apparent from the following description, accompanying drawings and the claims.

DETAILED DESCRIPTION

Figure 1:
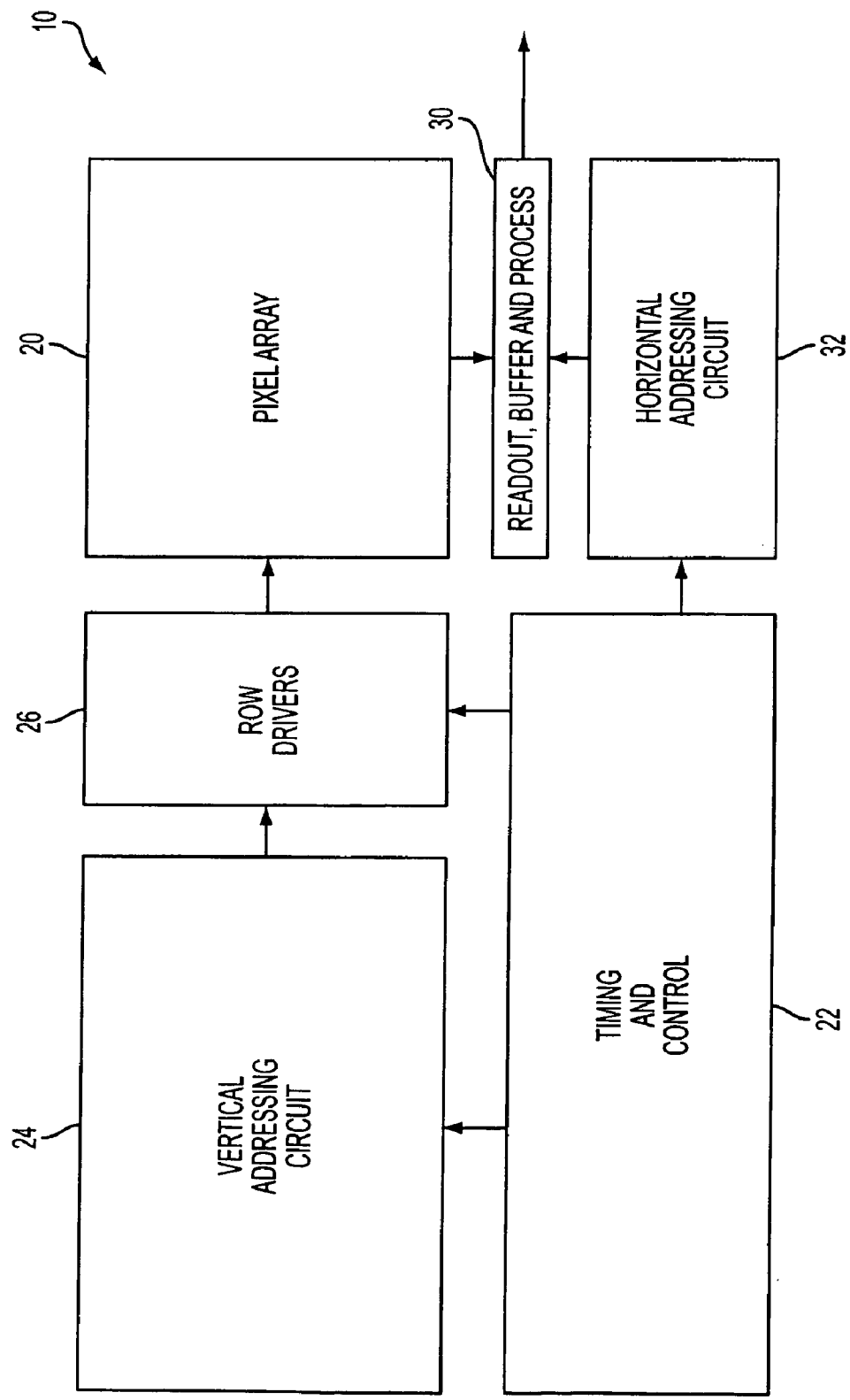
FIG. 1 is a block diagram of an exemplary CMOS active pixel sensor chip.

As shown in FIG. 1, an exemplary CMOS active pixel sensor integrated circuit imager 10 includes an array 20 of active pixel sensors and a controller 22 that provides timing and control signals to enable reading out and processing of signals stored in the pixels. Exemplary arrays have dimensions of 128 by 128 pixels or 256 by 256 pixels, although, in general, the size of the array 20 will depend on the particular implementation. The imager can be read out a row at a time using a parallel column readout architecture. The controller 22 selects a particular row of pixels in the array 20 by controlling the operation of a vertical addressing circuit 24 and row drivers 26. Signals stored in the selected row of pixels are read out to circuitry 30 that buffers the pixel signals before processing them. In one implementation, sampled pixel levels are converted to a corresponding set of digital signals. Signals for selecting the signals corresponding to a particular column in the array are provided from the controller 22 through a horizontal addressing circuit 32.

Figure 2:
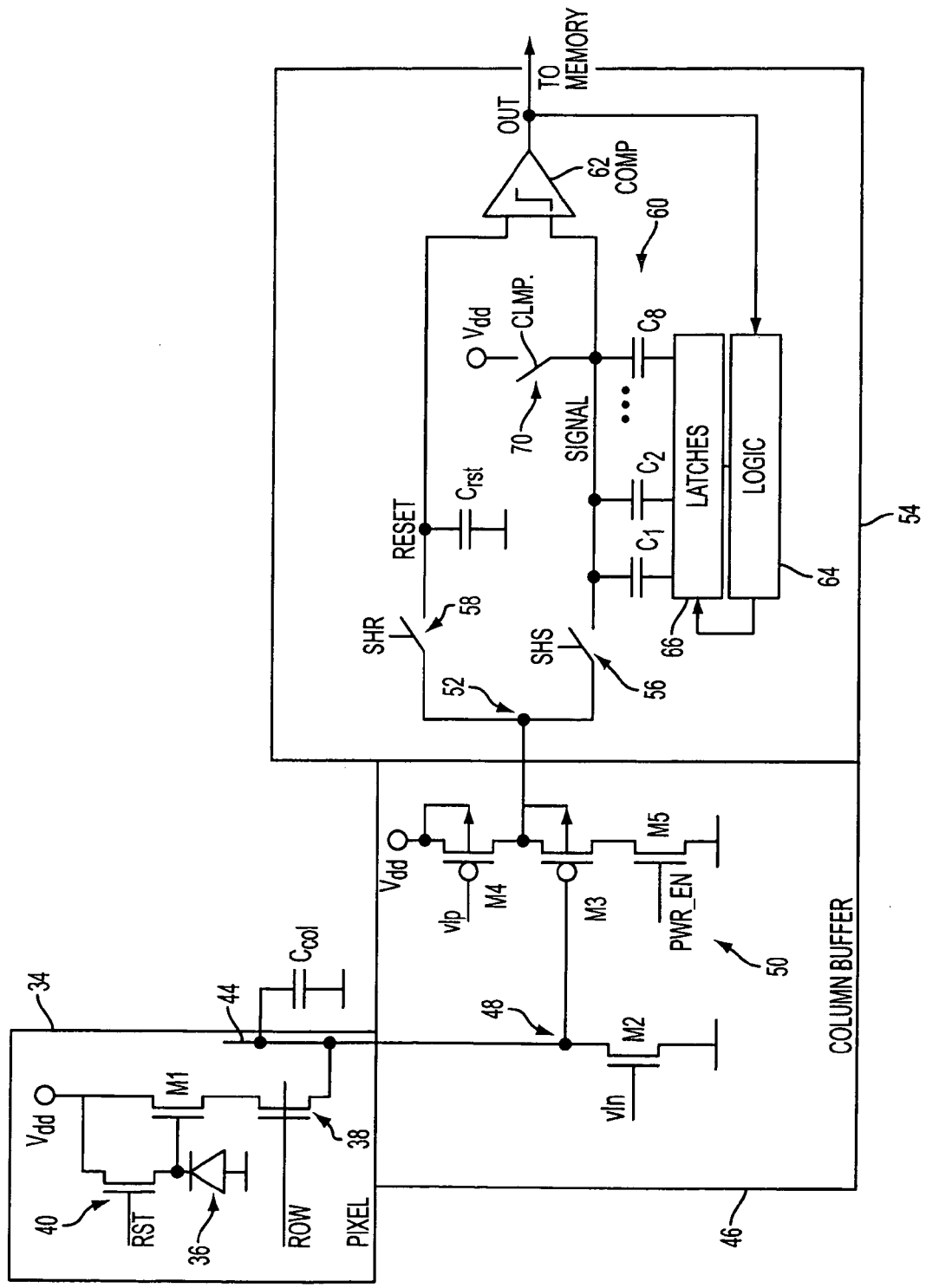
FIG. 2 illustrates further details of an exemplary n-MOS pixel with column readout and processing circuitry.

As shown in FIG. 2, CMOS active pixel sensors, such as the sensor 34, are located in respective columns of the array 20. Each sensor 34 can include a photo-sensitive element 36 buffered by an active n-MOS source-follower transistor M1 and a row selection switch that can be implemented, for example, by a transistor 38. A signal ROW is applied to the gate of the row selection transistor 38 to enable a particular row of pixels to be read out. The signal value on the photo-sensitive element 36 in the pixel 34 is switched through the corresponding source-follower transistor M1 and row selection transistor 38. In one implementation, the photo-sensitive element 36 includes a photodiode. In other implementations, the photo-sensitive element 36 includes a photogate. Each pixel 34 also includes a reset switch that can be implemented, for example, as a transistor 40 controlled by a signal RST applied to its gate. The photo-sensitive element 36 in the pixel is reset by enabling the corresponding reset transistor 40. Pixel signal and pixel reset values are loaded onto a column readout bus 44 that has a stray capacitance indicated by $C_{col}$.

The column readout bus 44 is coupled to a current sink that can be implemented, for example, as an n-MOS transistor M2 coupled to ground. A bias signal (vln) is applied to the gate of the transistor M2. The transistor M2 is coupled to a column buffer circuit 46. It is difficult to couple pixel signals from the pixel readout line 44 directly onto a signal processing circuit 54 at high speeds because of the circuit's additional capacitance. As shown in FIG. 2, signals on the bus 44 are buffered by a p-MOS source-follower circuit 50 that includes an active p-MOS transistor M3. In particular, signals from a node 48 are applied to the gate of the transistor M3. The buffer circuit 50 also includes a current sink, implemented by a p-MOS transistor M4, and a power enable switch, implemented as an n-MOS transistor M5 and connected in series with the active transistor M3. A signal PWR_EN is applied to the gate of the transistor M5.

Figure 3B:
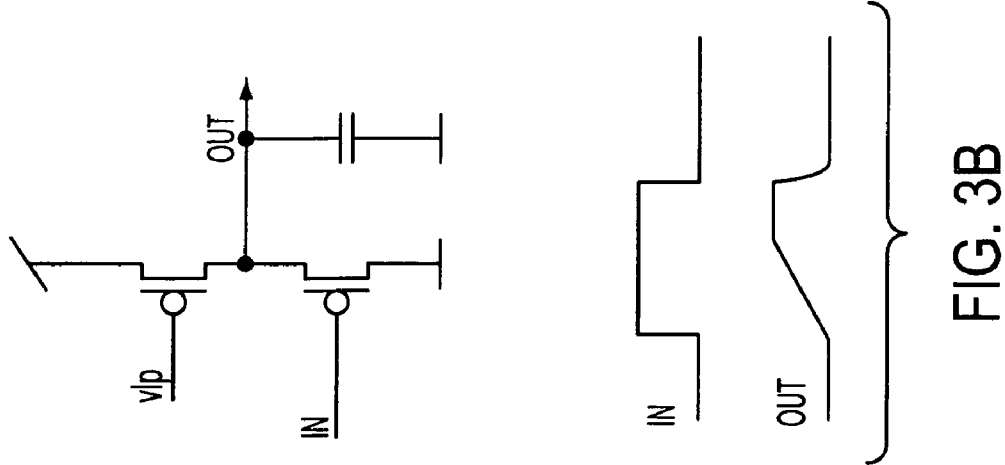
FIGS. 3A and 3B illustrate exemplary response times of n-MOS and p-MOS source-followers, respectively.
Figure 3A:
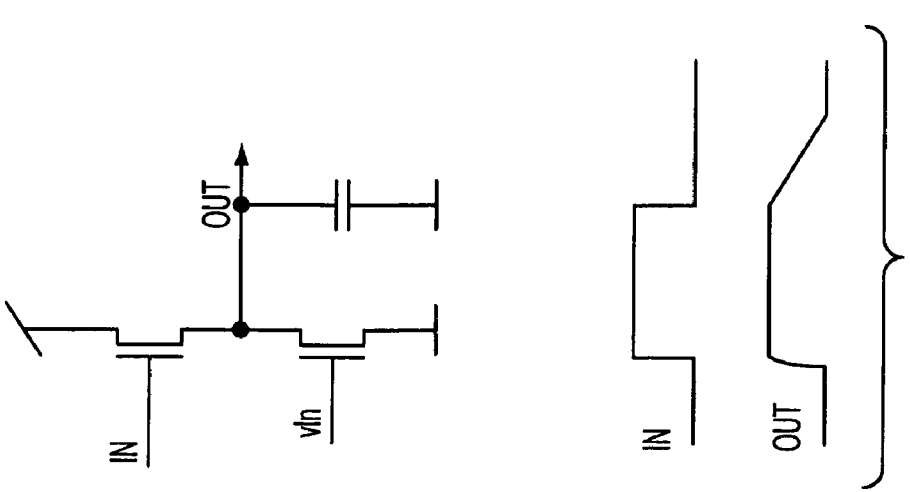

In general the n-MOS source-follower M1 and the p-MOS source-follower M3 respond differently to the rising and falling edges of a pulse. As shown, for example, in FIG. 3A, an n-MOS source-follower responds quickly to the rising edge of an input pulse 10. However, an n-MOS source-follower tends to respond relatively slowly to the falling edge of the pulse 10. Conversely, as shown in FIG. 3B, a p-MOS source-follower responds quickly to the falling edge of the input pulse 10, but relatively slowly to the rising edge of the pulse. Nevertheless, as described below, the imager 10 can be operated to achieve high sampling speeds of the pixel signal and reset values.

Signals appearing at the output of the p-MOS source follower M3, in other words, at node 52, are sampled by the column processing circuit 54 that, in one implementation, includes analog-to-digital conversion (ADC) circuit. The processing circuit 54 samples signals on the node 52 by closing a first switch 56, controlled by a signal SHS, or by closing a second switch 58, controlled by a signal SHR. Closing the first switch 56 couples the signal on node 52 to a binary-scaled capacitor network 60 that stores the sampled value. Closing the second switch 58 allows the signal on the node 52 to be sampled and stored by a capacitor $C_{rst}$. Sampled values stored, respectively, by the capacitor network 60 and the capacitor $C_{rst}$ are used as inputs to a comparator 62 that provides a digital output.

The binary-scaled capacitor network 60 is used to approximate the differential pixel output signal using a successive approximation technique. In one implementation, the capacitor network 60 includes eight capacitors C1 through C8 so that the analog pixel level can be converted to an 8-bit digital signal. The capacitor C1 corresponds to the most significant bit (MSB) in the digital signal, whereas the capacitor C8 corresponds to the least significant bit (LSB). The relationship between the values of the capacitors for adjacent bits is such that the capacitance corresponding to the more significant bit is twice the capacitance of the less significant bit. Thus, if the capacitor C1 has a capacitance of C, the capacitor C2 would have a capacitance of C/2. The capacitor C8 would then have a capacitance of $C/2^7$. The capacitors C1 through C8 have associated logic 64 and latches 66 that allow the lower plate of each capacitor, respectively, to be connected either to ground or to a reference voltage.

The processing circuit 54 also includes a clamping switch 70, one end of which is coupled to the common node of the capacitors C1 through C8 in the capacitor network 60. The switch 70 is controlled by a signal CLMP. When the switch 70 is closed, the second end of the switch is coupled to a relatively high voltage level $V_{dd}$. The function of the switch 70, which can be implemented, for example, as a transistor, is discussed in greater detail below.

In one implementation, each column of pixels has a column buffer circuit 46 and a processing circuit 54 associated with it. Therefore, an entire row of pixels can be read out and processed simultaneously. In general, pixel signal and pixel reset levels are read out from the pixels 34, one row at a time. Once the pixel signal and pixel reset levels are sampled and stored by the processing circuit 54, analog-to-digital conversion or other processing can be performed.

Figure 4:
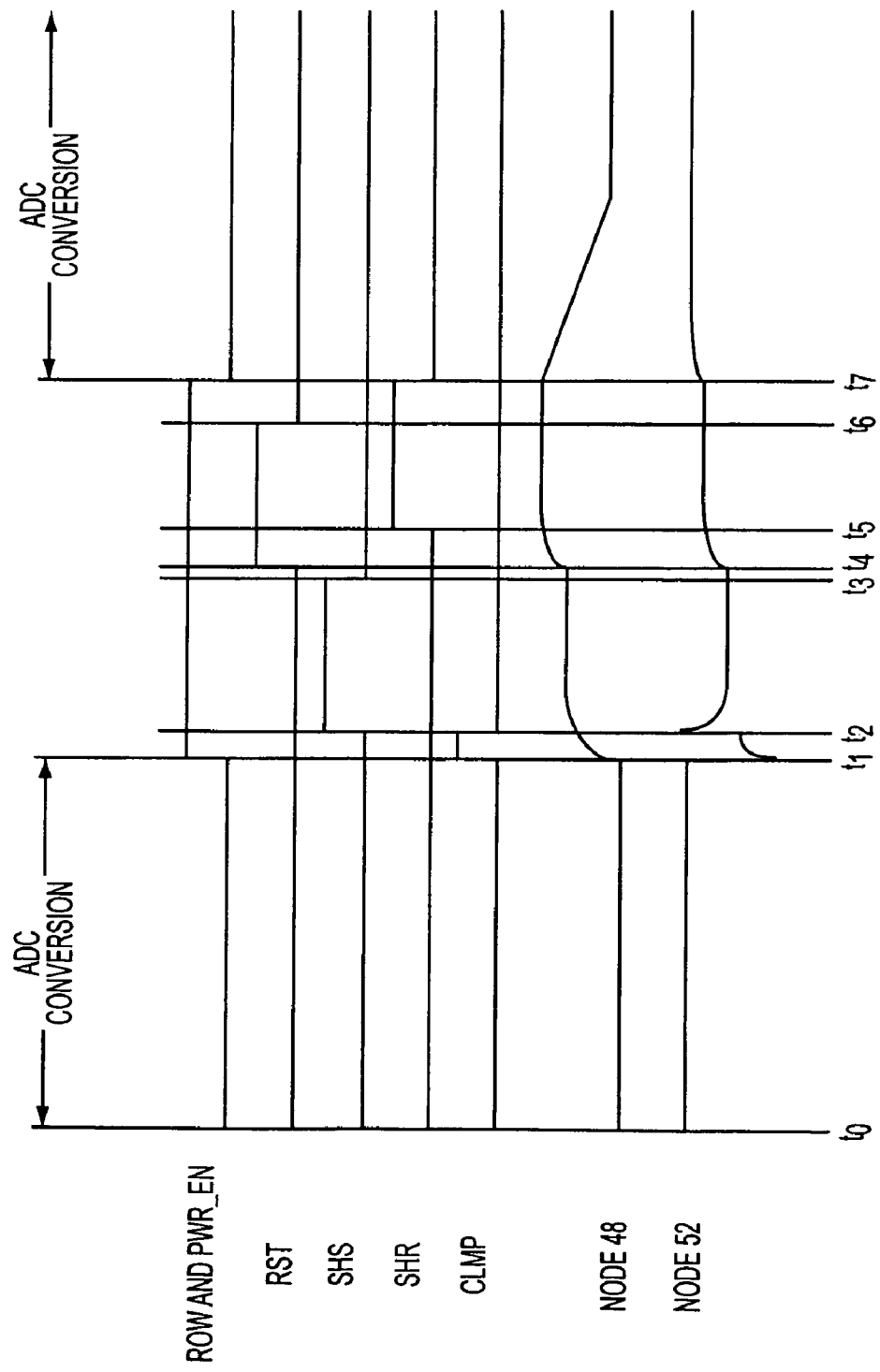
FIG. 4 illustrates a timing diagram and waveforms of various signals associated with the pixel readout of FIG. 2.

Further details of the operation of the circuit in FIG. 2 are explained in conjunction with the timing diagram and signal waveforms shown in FIG. 4. During the period when analog-to-digital conversion is performed, the row selection switch 38 in the pixel 34 is disabled, in other words, the signal ROW goes low, as shown between the times $t_0$ and $t_1$ and immediately following the time $t_7$. Disabling the row selection switch 38 during the conversion period allows the column capacitor $C_{col}$ to be discharged to ground through the current sink M2 prior to reading out and sampling the next pair of pixel signal and reset levels. In other words, the pixel readout line 44 is clamped to a low voltage level before being coupled to the output of the n-MOS source-follower M1.

Clamping the bus 44 to a low voltage level prior to reading out the pixel level onto the bus through the n-MOS source-follower M1 can help ensure that the pixel signal level, which may have a relatively low signal level, is still somewhat higher than the voltage level on the bus. Therefore, when the row selection switch 38 is subsequently enabled at time $t_1$ to read out the pixel signal value, the input signal on the gate of the source-follower transistor M1 will appear as a rising signal with respect to the signal on the column bus 44. As shown in FIG. 4, the waveform corresponding to the signal on node 48 begins to rise just after the row selection switch 38 is enabled at time $t_1$. The rising signal can be read out to the column bus 44 relatively quickly because the source-follower M1 is an n-MOS transistor (see FIG. 3A). When the pixel 34 subsequently is reset at time $t_4$, the reset pixel level typically is greater than the pixel signal level. Therefore, the input signal on the gate of the source-follower transistor M1 again appears as a rising signal with respect to the voltage at node 48. As shown in FIG. 4, the waveform corresponding to the signal on node 48 begins to rise just after the reset switch 40 is enabled at time $t_4$. Therefore, the pixel reset level also can be read out to the column bus 44 quickly.

Figure 5:
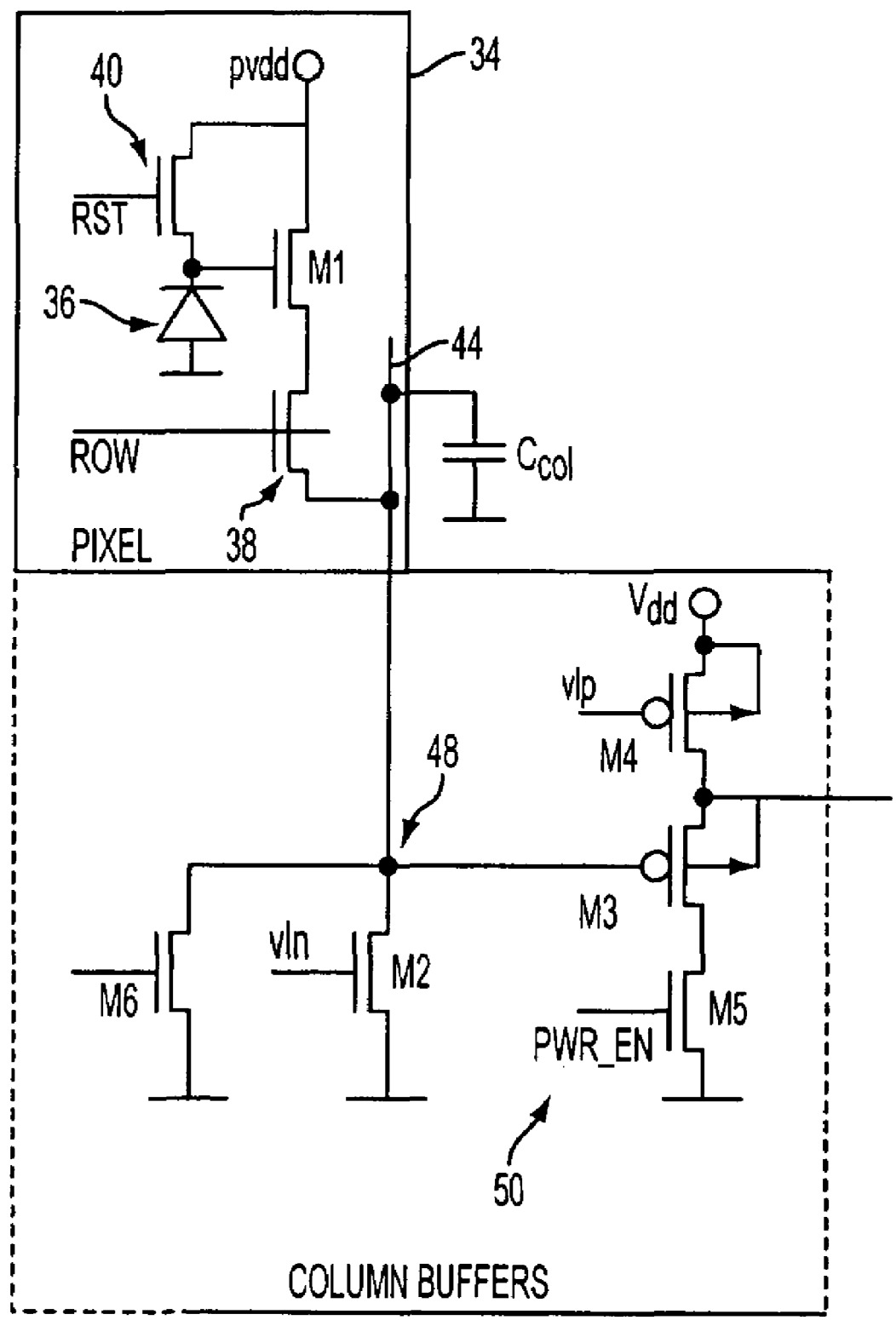
FIG. 5 illustrates details of an exemplary pixel and associated column buffer circuitry according to another implementation.

Other techniques can be used to clamp the pixel readout line 44 to a low voltage. For example, instead of disabling the row selection switch 38, another switch, implemented as transistor M6 in FIG. 5, can be placed in parallel with the current sink M2. During the conversion period, the switch M6 is enabled so that the column capacitor $C_{col}$ is discharged to ground. On the other hand, discharging the bus 44 by disabling the row selection switch 38 during the conversion period can provide the additional advantage of reducing the power consumption because signals are not passed by the source-follower M1 during that time. In some implementations, the conversion period has a duration on the order of about half a micro-second.

When the pixel signal (or pixel reset) value is read out, the signal appearing at the output of the p-MOS source-follower buffer circuit 50, in other words, the signal appearing at node 52, preferably is not immediately sampled by the column processing circuit 54. Rather, the load for the p-MOS source-follower M3 is disabled for a short time after the pixel signal or pixel reset level is read out. In particular, a slight delay is introduced between the time $t_1$ when the row selection switch 38 is enabled and the time when the pixel signal value is sampled by closing the switch 56. The switch 56 is closed when the signal SHS goes high at time $t_2$. Similarly, a slight delay is introduced between the time $t_4$ when the pixel 34 is reset and the time when the pixel reset value is sampled by closing the switch 58. The switch 58 is closed when the signal SHR goes high at time $t_5$. In one implementation, the delays between the times $t_1$ and $t_2$ and between the times $t_4$ and $t_5$ are approximately thirty nano-seconds. Different values for the delays may be appropriate in other implementations. The delays allow the voltage levels at the p-MOS source-follower circuit 50 to settle prior to being sampled by the column processing circuit 54.

During the period between $t_1$ and $t_2$, in other words, at about the time the row enable signal (ROW) goes high until about the time the signal SHS goes high, the switch 70 in the processing circuit 54 is closed to pre-charge the common node of the capacitor network 60 to a predetermined relatively high voltage level, for example, the power supply voltage $V_{dd}$. In other words, the common node is clamped to the power supply or other high voltage. That can help ensure that when the signal SHS subsequently goes high to close the switch 56 and couple the output of the column buffer 50 (node 52) to the capacitor network 60, the voltage at the output of the column buffer (node 52) initially will be higher than the voltage at the input to the column buffer (node 48). As indicated in FIG. 4, the signal appearing at node 52 shortly after SHS goes high, in other words, shortly after time $t_2$, is a falling signal as a result of the active transistor M3 in the p-MOS column buffer 50 discharging the ADC capacitance to the settling value. By pre-charging the common node of the capacitor network 60 to a relatively high voltage, the pixel signal levels can be sampled quickly through the p-MOS source-follower M3 which provides relatively fast settling of falling signals at its output (see FIG. 3B). Fast sampling speeds can be achieved regardless of variations in signal levels among pixels.

Figure 6:
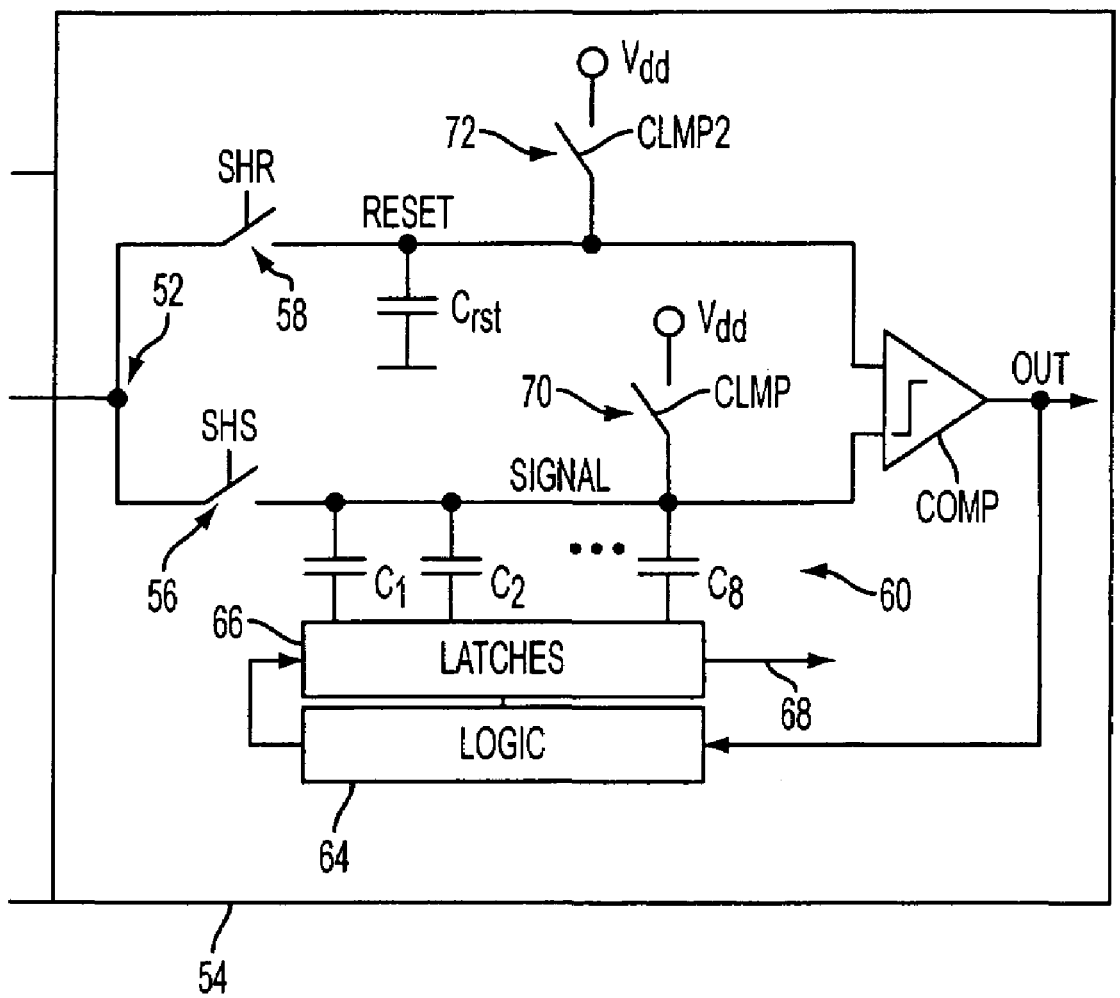
FIG. 6 illustrates details of a signal processing circuit according to a further implementation.

As shown in FIG. 6, a similar clamping switch 72 can be added to pre-charge the reset capacitor $C_{rst}$ to the voltage level $V_{dd}$ just before the pixel reset level is sampled by the processing circuit 54. In that case, a signal CLMP2 can be used to control the state of the switch 72. When the signal CLMP2 goes high, the switch 72 is closed, thus pre-charging the capacitor $C_{rst}$ to a voltage level higher than the pixel reset level appearing at the input of the source-follower M3.

In some applications, the pixel reset level does not vary much from pixel to pixel, and, therefore, the voltage swing at the capacitor $C_{rst}$ is small. In such situations, the reset capacitor $C_{rst}$ need not be pre-charged to a high voltage level, but can remain in a charged state. As shown in FIG. 2, the additional clamping switch 72 can be left out of the column processing circuit 54.

Once the pixel signal and pixel reset levels have been sampled by the circuit 54, the pixel signal can converted to a corresponding set of digital signals. As previously mentioned, a successive approximation technique can be used to perform the analog-to-digital conversion. Initially, the bottom plates of the capacitors C1 through C8 are coupled to ground. The bottom plate of the largest capacitor C1 then is connected to the reference voltage. If the signal on the common node of the capacitor network 60 is greater than the voltage stored by the reset capacitor $C_{rst}$, then the output of the comparator 62 will be high. In response to the high output of the comparator 62, the logic 64 causes the corresponding latch 66 to reconnect the bottom plate of the capacitor C1 to ground. Conversely, if the signal on the common node of the capacitor network 60 is less than the voltage stored by the reset capacitor $C_{rst}$, then the output of the comparator 62 will be low. In response to the low output of the comparator 62, the logic 64 causes the corresponding latch 66 to hold the bottom plate of the capacitor C1 at the reference voltage. That process is repeated, in sequence, for each of the capacitors C1 through C8. The digital bits that correspond to the pixel signal can be read directly from the output of the comparator 62 and sampled, for example, into a memory (not shown) that can be separate from the circuit 54. In the illustrated implementation, a digital code of 11111111, for example, would correspond to a low pixel signal level, whereas a digital code of 00000000 would correspond to a high pixel signal level.

Figure 7:
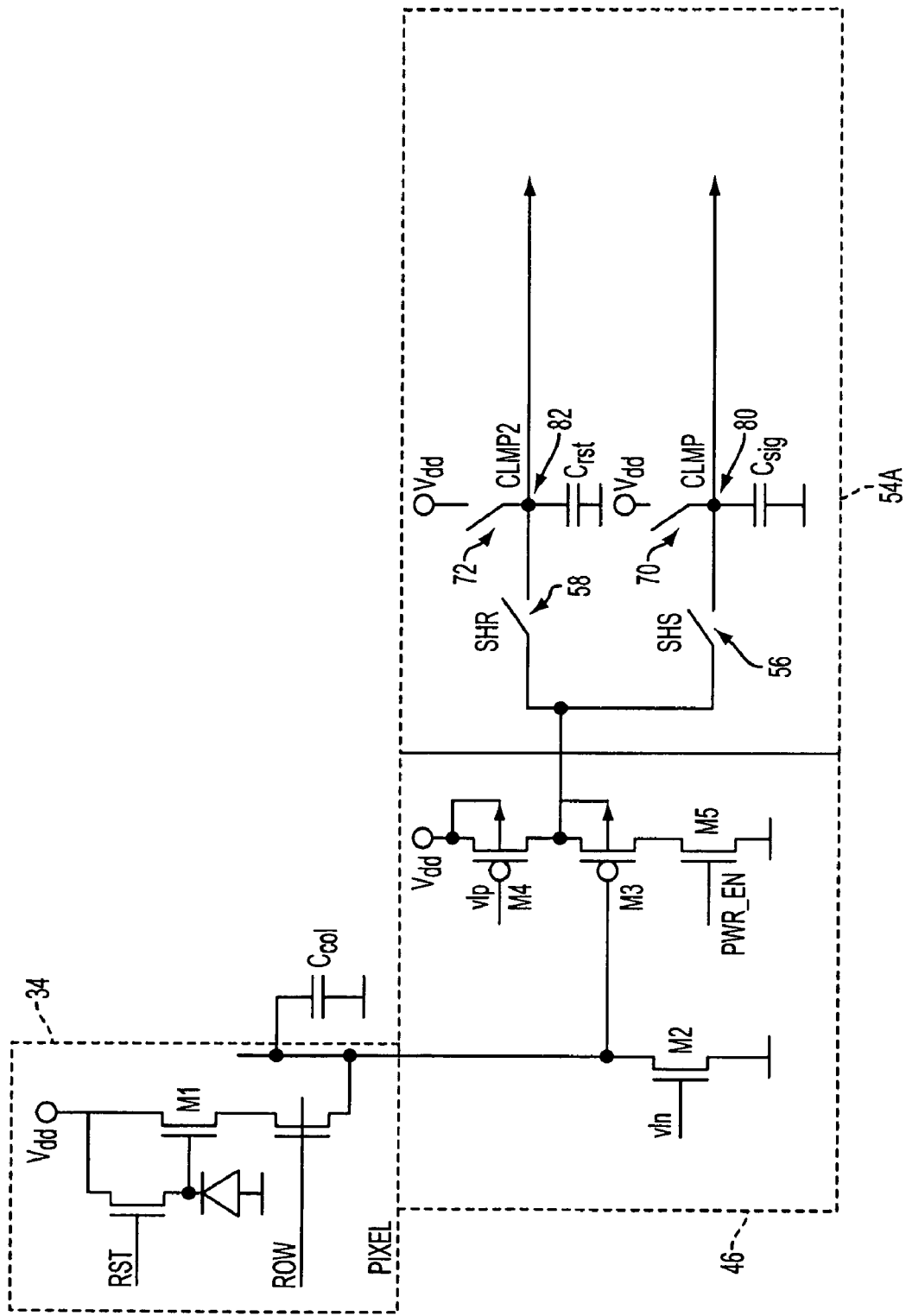
FIG. 7 illustrates details of an n-MOS pixel with column readout and processing circuitry according to another implementation.

Although the signal processing circuit 54 illustrated in FIG. 2 includes analog-to-digital conversion circuitry, other signal processing circuits can be used as well. More generally, as shown in FIG. 7, signal processing circuitry 54A includes switches 56, 58 that can be closed selectively to store the pixel signal or the pixel reset signal on one of two capacitive storage nodes 80, 82, respectively. As previously discussed, before passing the pixel signal through the p-MOS source-follower M3 to the processing circuit 54A, the voltage across the capacitor $C_{sig}$, in other words the voltage at node 80, is clamped to a voltage that is greater than the voltage of the pixel signal at the input to the p-MOS source-follower. The pixel 34 then can be reset, and the pixel signal read out as described above. Before passing the reset signal through the p-MOS source-follower M3 to the processing circuit 54A, the voltage across the capacitor $C_{rst}$, in other words the voltage at node 82, can be clamped to a voltage that is greater than the voltage of the reset signal at the input to the p-MOS source-follower. As discussed above, clamping the voltage across the capacitor $C_{rst}$ may not be necessary in some implementations. Once the pixel signal and reset levels are stored in the processing circuit 54A, the stored signals can be processed according to any known technique.

Figure 8:
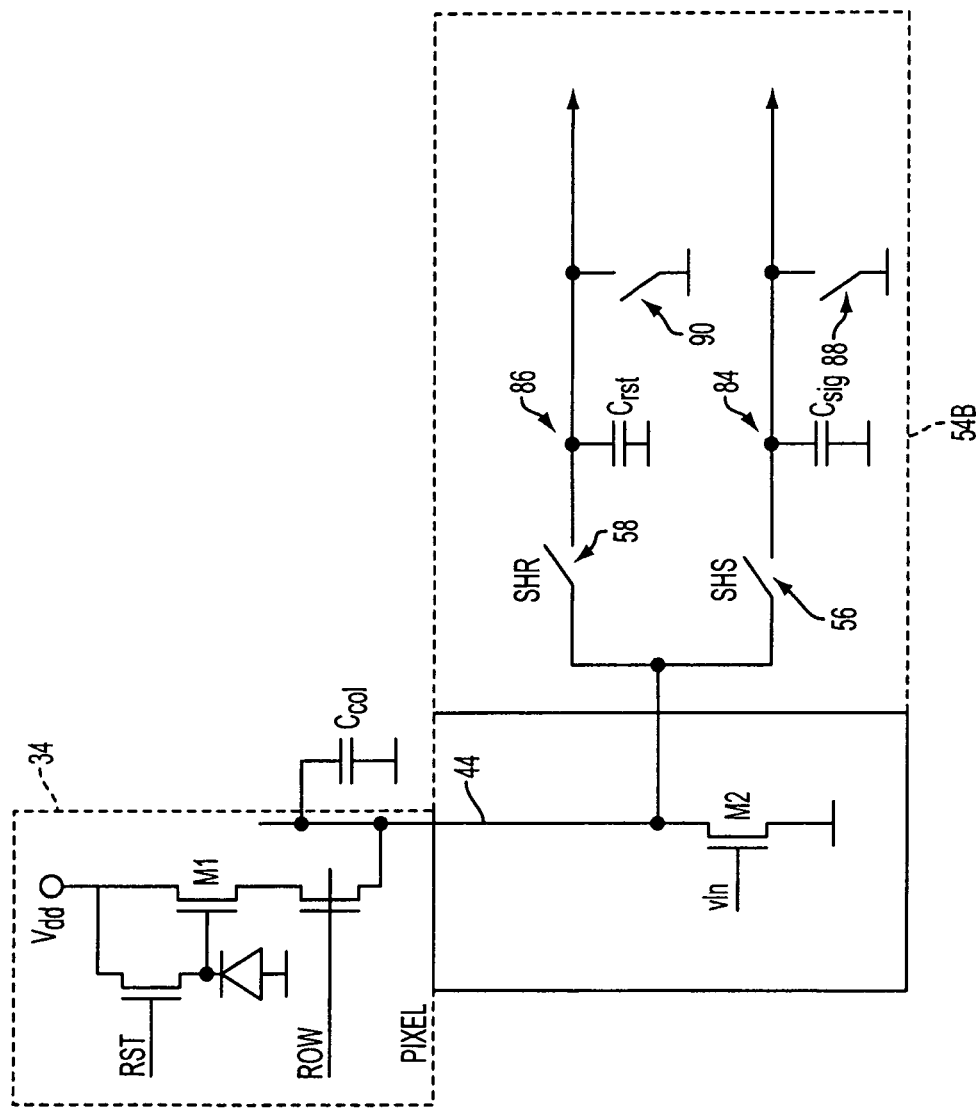
FIG. 8 illustrates details of an n-MOS pixel with column readout and processing circuitry according to a further implementation.

Although in many implementations it will be desirable to incorporate the p-MOS buffer circuit 50 into the pixel readout circuitry, in some situations the p-MOS buffer circuit can be left out, as shown, for example, in FIG. 8. In other words, signals read out from the pixel 34 onto the pixel readout line 44 can be coupled directly into the signal processing circuit 54B by selectively closing one of the two switches 56, 58. Prior to passing the pixel signal to the processing circuit 54B, the voltage across the capacitor $C_{sig}$, in other words, the voltage at node 84, is clamped to a voltage level that is less than the voltage level corresponding to the pixel signal. For example, the voltage at node 84 can be clamped to ground by temporarily closing the switch 88. Preferably, the capacitive node 84 is clamped at about the same time and to substantially the same voltage as the pixel readout line 44. Thus, when the pixel signal on the readout line 44 is passed to the processing circuit 54B by closing the switch 56, the voltage at node 84 will be less than the voltage corresponding to the pixel signal. That permits fast sampling of the pixel signal through the n-MOS source-follower M1. Similarly, the capacitive storage node 86 can be clamped to a low voltage such as ground before passing the pixel reset level to the processing circuit 54B. The node 86 can be clamped by closing the switch 90 temporarily. Once the pixel signal and reset levels are stored in the processing circuit 54A, the stored signals can be processed according to any known technique.

Figure 9:
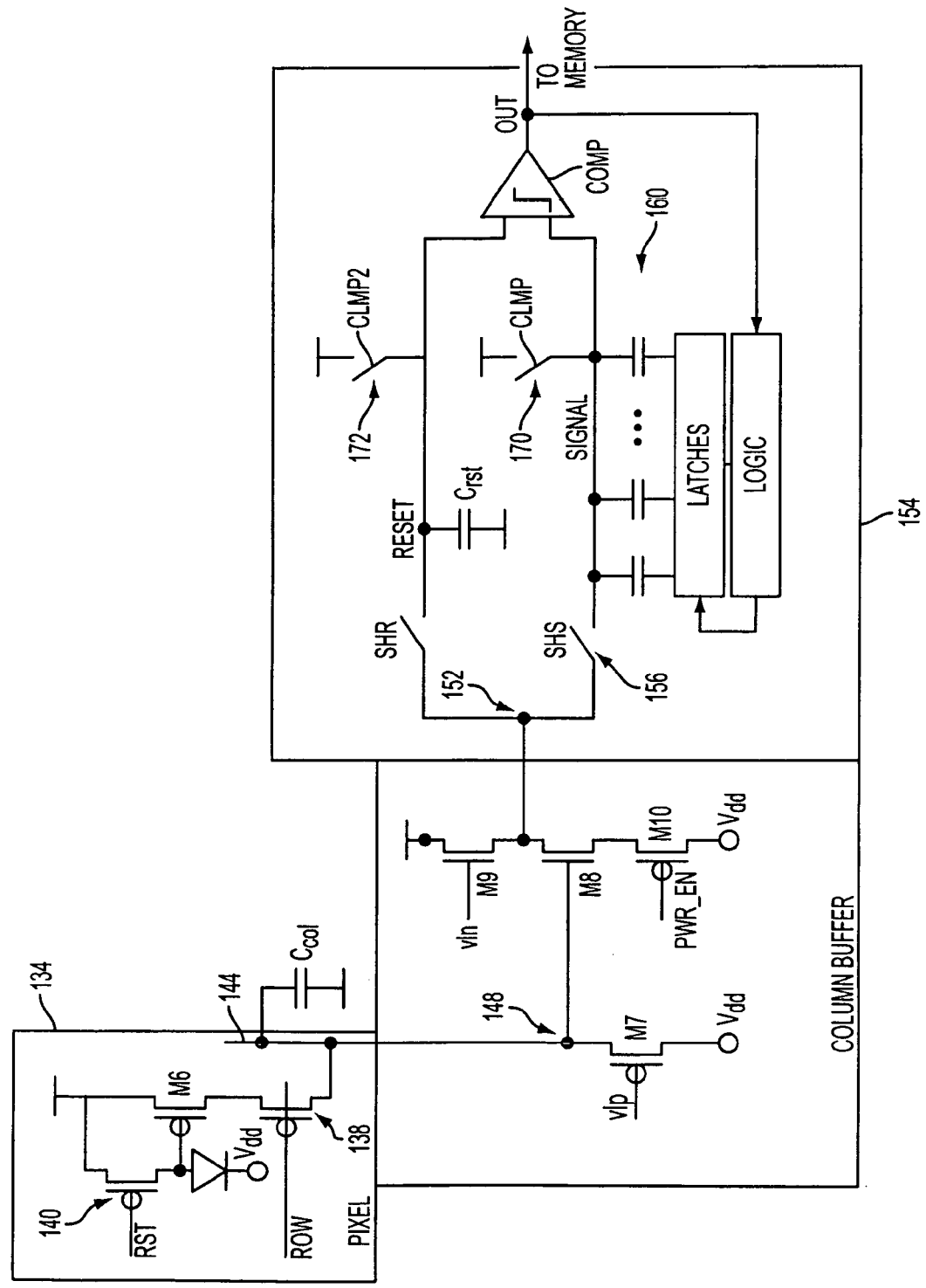
FIG. 9 illustrates details of exemplary readout and processing circuitry for use with a p-MOS pixel.

The foregoing descriptions are based on an n-MOS pixel 34. However, the techniques described here also can be used with a p-MOS pixel 134 (see, e.g., FIG. 9). In that case, each n-MOS transistor shown in FIG. 2 is replaced by a p-MOS transistor and vice-versa. For example, the n-MOS transistors M1, M2, M5, 38 and 40 of FIG. 2 would be replaced by p-MOS transistors M6, M7, M10, 138 and 140, respectively. Similarly, the p-MOS transistors M3 and M4 would be replaced by n-MOS transistors M8 and M9, respectively. In addition, the polarity of various control signals, including ROW, PWR_EN and RST, is reversed.

Prior to reading out the signal from the pixel 134, the voltage on the readout line 144 is clamped to a level, such as $V_{dd}$, that is higher than the pixel level. That allows high-speed sampling of the pixel signal onto the bus 144 through the p-MOS source-follower M1 (see FIG. 3B). The bus 144 can be clamped to the high voltage, for example, either by disabling the pixel selection switch 138 or enabling another switch (not shown) to couple the bus to $V_{dd}$.

Similarly, prior to sampling the pixel signal level that appears at node 148 onto the processing circuit 154, the common node of the capacitor network 160 can be clamped to a voltage level, such as ground, that is less than the voltage appearing on the node 148. That can be accomplished, for example, by closing a switch 170 to temporarily couple the common node to ground. When the switch 156 subsequently is closed to couple the common node of the capacitor network 160 to the output of the n-MOS source-follower M8, the signal from the node 148 can be sampled into the processing circuit 154 quickly.

The pixel 134 can be reset and a pixel reset level can be read out and stored by the processing circuit 154 in a manner analogous to the techniques described above in connection with FIGS. 2 and 6. In some cases, the node in the processing circuit 154 onto which pixel reset level is stored can be clamped to a relatively low voltage by closing the switch 172 prior to sampling the pixel reset level. The stored signals then can be processed using analog-to-digital or other techniques as described above.

In some implementations, the n-MOS source-follower circuit including switches M8, M9 and M10, can be left out of the circuit. In other words, signals from the p-MOS pixel 134 can be read out onto the readout line 144 and passed directly to the processing circuit. In that case, the capacitive storage node for storing the pixel signal can be clamped to a voltage higher than the voltage level corresponding to the pixel signal that is to be stored. Subsequently, the pixel readout line is coupled to the processing circuit so that pixel signal can be stored by the capacitive storage node.

In general, the controller 22 provides the various control signals to control the state of the various components in the pixels 34, 134 and the corresponding readout and processing circuits. Some circuit functions controlled by the controller 22 may involve one or more control signals.

The foregoing techniques can be used to implement an active pixel sensor integrated circuit chip with high sampling speeds. The settling time of the sampled signals need not be limited by the amount of current that can be drawn by the column buffers 50. In some implementations, sampling speeds on the order of about one micro-second or less are achievable.

Other implementations are within the scope of the following claims.

What is claimed is:

1. A method of processing pixel signals, the method comprising:
   clamping a pixel readout line to a voltage level less than a voltage corresponding to a pixel signal;
   subsequently coupling the pixel readout line to an output of a source-follower transistor and reading out the pixel signal onto the pixel readout line;
   subsequently clamping a capacitive storage node in a pixel signal processing circuit to a voltage less than a voltage corresponding to the pixel signal appearing on the pixel readout line;
   subsequently coupling the pixel readout line to the storage node in the processing circuit; and
   storing a signal corresponding to the pixel signal that was read out on the capacitive storage node.

2. The method of claim 1, wherein clamping the pixel readout line comprises discharging a capacitance on the pixel readout line.

3. The method of claim 2, wherein discharging the pixel readout line is performed while processing a previously-stored pixel signal.

4. The method of claim 2, wherein the discharging the capacitance on the pixel readout line comprises disabling a pixel selection switch.

5. The method of claim 2, wherein the discharging the capacitance on the pixel readout line comprises enabling a switch to couple the pixel readout line to ground.

6. The method of claim 1 wherein the storage node is clamped to substantially the same voltage and at about the same time as the pixel readout line.

7. The method of claim 1, further comprising:
   resetting the pixel;
   subsequently reading out a reset signal through an n-MOS source-follower; and
   storing on a second capacitive storage node in the processing circuit a signal that corresponds to the reset signal.

8. The method of claim 7, further comprising:
   prior to storing the signal corresponding to the reset signal, clamping the second capacitive storage node to a voltage less than the voltage corresponding to the reset signal; and
   subsequently coupling the pixel readout line to the second storage node to store the signal corresponding to the reset signal on the second storage node.

9. The method of claim 1, further comprising passing the pixel signal that was read out through a p-MOS source-follower.

10. The method of claim 9, further comprising:
    clamping a capacitive storage node in a pixel signal processing circuit to a voltage greater than the pixel signal appearing at an input to the p-MOS source-follower, wherein the storage node is clamped before passing the pixel signal through the p-MOS source-follower to the processing circuit; and
    subsequently coupling an output of the p-MOS source-follower to the storage node in the processing circuit.

11. The method of claim 10, further comprising:
    resetting the pixel after storing the signal corresponding to the pixel signal in the processing circuit;
    subsequently reading out a reset signal through an n-MOS source-follower;
    passing the reset signal through the p-MOS source-follower to the processing circuit; and storing a signal corresponding to the reset signal in the processing circuit.

12. The method of claim 11, wherein, prior to passing the reset signal through the p-MOS source-follower, a second capacitive storage node in the processing circuit is clamped to a voltage level higher than the reset signal appearing at the input to the p-MOS source-follower.

13. The method of claim 11, further comprising converting a difference between the pixel and reset signals stored by the processing circuit to a corresponding set of digital signals.

14. The method of claim 1, wherein the reading out the pixel signal onto the pixel readout line comprises reading out the pixel signal through the source-follower transistor.

15. The method of claim 14, wherein the source-follower transistor comprises an n-MOS transistor.

16. The method of claim 1, wherein the capacitive storage node comprises a binary scaled capacitor network.

17. An imager comprising:
a pixel readout line;
an active pixel sensor comprising a source-follower transistor through which signals sensed by the sensor can be read out to the pixel readout line, a first switch that can be enabled to read out signals from the sensor, and a reset switch;
a signal processing circuit that can be coupled to the pixel readout line; and
a controller configured to provide control signals to cause the pixel readout line to be clamped to a voltage level less than a voltage corresponding to a signal sensed by the sensor, and subsequently to cause the sensor signal to be read out through the source-follower transistor to the pixel readout line and to be stored by the processing circuit,
wherein the processing circuit comprises a capacitive storage node, and
wherein the controller is further configured to provide control signals to subsequently cause the capacitive storage node to be clamped to a voltage less than a voltage corresponding to the sensor signal appearing on the pixel readout line, and subsequently to cause the pixel readout line to be coupled to the storage node.

18. The imager of claim 17, wherein the controller is configured to provide a control signal to cause the first switch to be disabled while a previously-stored sensor signal is being processed by the processing circuit.

19. The imager of claim 17, further comprising:
a third switch coupled between the pixel readout line and ground,
wherein the controller is configured provide a control signal to cause the pixel readout line to be clamped by enabling the third switch.

20. The imager of claim 17, wherein the storage node is clamped to substantially the same voltage and at about the same time as the pixel readout line.

21. The imager of claim 17, wherein:
the processing circuit further comprises a second capacitive storage node, and
the controller is configured to provide control signals to cause the reset switch in the pixel to be enabled, and subsequently to cause a reset signal to be read out onto the pixel readout line through the source-follower transistor, and to cause a signal that corresponds to the reset signal to be stored on the second capacitive storage node.

22. The imager of claim 17, wherein the capacitive storage node comprises a binary scaled capacitor network.

* * * * *